(12) United States Patent
Lu et al.

(10) Patent No.: US 11,706,698 B2
(45) Date of Patent: Jul. 18, 2023

(54) ACCESS METHOD AND TRANSMISSION POINT

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 22 days.

(21) Appl. No.: 17/088,491

(22) Filed: Nov. 3, 2020

(65) Prior Publication Data

US 2021/0076316 A1 Mar. 11, 2021

Related U.S. Application Data

(63) Continuation of application No. PCT/CN2019/087770, filed on May 21, 2019.

(30) Foreign Application Priority Data

May 22, 2018 (CN) .......................... 201810497423.7

(51) Int. Cl.
*H04W 48/16* (2009.01)
*H04B 7/155* (2006.01)
(Continued)

(52) U.S. Cl.
CPC ........ *H04W 48/16* (2013.01); *H04B 7/15507* (2013.01); *H04W 48/08* (2013.01); *H04W 56/001* (2013.01); *H04W 72/21* (2023.01)

(58) Field of Classification Search
CPC ............ H04B 7/15507; H04W 56/001; H04W 72/0413; H04W 84/047; H04W 36/0055
See application file for complete search history.

(56) References Cited

U.S. PATENT DOCUMENTS 9,281,889 B2  3/2016  Kim et al.
9,490,954 B2  11/2016  Ji et al.
(Continued)

FOREIGN PATENT DOCUMENTS

CN  101990325 A  3/2011
CN  101998657 A  3/2011
(Continued)

OTHER PUBLICATIONS

EPO, Extended European Search Report for European Patent Application No. 19807503.8, dated May 21, 2021. 9 pages.
(Continued)

*Primary Examiner* — Minjung Kim
(74) *Attorney, Agent, or Firm* — Perkins Coie LLP

(57) ABSTRACT

Provided are an access method and transmission point. In the embodiments of the present invention, indication information sent by a second transmission point is received by means of a first transmission point and is used for indicating that said second transmission point supports relay functionality, such that said first transmission point is capable of accessing, according to the indication information, the wireless access network on which the second transmission point is located; thus the first transmission point is taken as a relay node and accesses the wireless access network.

13 Claims, 2 Drawing Sheets

Sending, by a second transmission point, indication information to a first transmission point, wherein the indication information is used for indicating that the second transmission point supports a relay function, so that the first transmission point may access a wireless access network where the second transmission point is located according to the indication information ⟋201

(51) Int. Cl.
*H04W 48/08* (2009.01)
*H04W 72/04* (2023.01)
*H04W 56/00* (2009.01)
*H04W 72/21* (2023.01)

(56) References Cited

U.S. PATENT DOCUMENTS

| | | | |
|---|---|---|---|
| 10,206,232 | B2 | 2/2019 | Novlan et al. |
| 2010/0046418 | A1 | 2/2010 | Horn et al. |
| 2011/0065379 | A1* | 3/2011 | Sakoda ............... H04W 72/04 455/7 |
| 2013/0023204 | A1* | 1/2013 | Ode ................. H04B 7/15507 455/11.1 |
| 2013/0183971 | A1 | 7/2013 | Tamaki et al. |
| 2014/0301371 | A1* | 10/2014 | Maeda ............... H04W 84/005 370/331 |
| 2015/0043422 | A1 | 2/2015 | Fujishiro et al. |
| 2018/0092139 | A1 | 3/2018 | Novlan et al. |
| 2019/0028906 | A1* | 1/2019 | Chen ................. H04W 40/22 |
| 2020/0053680 | A1* | 2/2020 | Abedini ........... H04W 56/0025 |
| 2021/0143959 | A1* | 5/2021 | Xu ................... H04W 40/22 |
| 2022/0094423 | A1* | 3/2022 | Patel ................. H04W 52/08 |

FOREIGN PATENT DOCUMENTS

| | | | |
|---|---|---|---|
| CN | 102111214 | A | 6/2011 |
| CN | 102123480 | A | 7/2011 |
| CN | 102761862 | A | 10/2012 |
| CN | 102833875 | A | 12/2012 |
| CN | 102870349 | A | 1/2013 |
| CN | 103733683 | A | 4/2014 |
| CN | 104023411 | A | 9/2014 |
| CN | 104185282 | A | 12/2014 |
| CN | 105122729 | A | 12/2015 |
| CN | 106034343 | A * | 10/2016 |
| CN | 106034343 | A | 10/2016 |
| JP | 2008211632 | A | 9/2008 |
| JP | 2011061632 | A | 3/2011 |
| JP | 2014522211 | A | 8/2014 |
| KR | 20140062484 | A | 5/2014 |
| RU | 2557769 | C2 | 7/2015 |
| WO | 2010080195 | A3 | 9/2010 |
| WO | 2011121714 | A1 | 10/2011 |
| WO | 2011162212 | A1 | 12/2011 |
| WO | 2013023171 | A1 | 2/2013 |

OTHER PUBLICATIONS

IPA, Examination Report No. 1 for Australian Patent Application No. 2019273274, dated Jun. 28, 2021. 3 pages.
Rospatent, First Office Action for Russian Patent Application No. 2020138621, dated Apr. 14, 2021. 12 pages with English translation.
International Search Report dated Jun. 27, 2019 of PCT/CN2019/087770 (4 pages).
Examination Report for Indian Application No. 202027049717 dated Dec. 10, 2021. 7 pages with English translation.
Notice of Acceptance for Australian Application No. 2019273274 dated Dec. 2, 2021. 3 pages.
Notice of Reasons for Refusal for Japanese Application No. 2020-563603 dated Dec. 10, 2021. 8 pages with English translation.
Notification of Reason for Refusal for Korean Application 10-2020-7032728 dated Sep. 26, 2021. 14 pages with English translation.
Decision of Refusal for Japanese Application No. 2020-563603 dated Apr. 15, 2022. 4 pages with English translation.
Examination Report for European Application No. 19807503.8 dated Feb. 11, 2022. 5 pages.
Notice of Final Rejection for Korean Application No. 10-2020-7032728 dated Mar. 26, 2022. 10 pages with English translation.
First Office Action of the Chinese application No. 202011200654.0, dated Jun. 2, 2022. 14 pages with English Translation.
First Written Opinion of the Singaporean application No. 11202011138U, dated Aug. 2, 2022. 8 pages.
Second Final Rejection of the Korean application No. 10-2020-7032728, dated May 30, 2022. 10 pages with English Translation.
Decision of Rejection for Chinese Application No. 202011200654.0 dated Nov. 1, 2022. 8 pages with English translation.
Examination Report for European Application No. 19807503.8 dated Sep. 2, 2022. 7 pages.
Reconsideration Report by Examiner before Appeal for Japanese Application No. 2020-563603 dated Oct. 4, 2022. 7 pages with English translation.
Second Office Action for Chinese Application No. 202011200654.0 dated Aug. 19, 2022. 10 pages with English translation.
Notice of Reasons for Refusal for Japanese Application No. 2020-563603 dated Jan. 27, 2023. 15 pages with English translation.
Hearing Notice for Indian Application No. 202027049717 dated Apr. 11, 2023. 3 pages with English translation.

* cited by examiner

ACCESS METHOD AND TRANSMISSION POINT

CROSS-REFERENCE TO RELATED APPLICATION

This application is a continuation application of International Application No. PCT/CN2019/087770, filed on May 21, 2019, which claims the priority to Chinese Patent Application No. 201810497423.7 filed on May 22, 2018, and the entire disclosures of both applications are hereby incorporated by reference.

TECHNICAL FIELD

The present disclosure relates to communication technology, in particular to an access method and a transmission point.

BACKGROUND

In a wireless communication system such as a Long Term Evolution-Advanced (LTE-A) system, a Relay Node (RN) is introduced between a terminal and an Evolved NodeB (eNB). The relay node may be wirelessly connected to a cell under an eNB to which the relay node belongs. The eNB to which the relay node belongs is called a Donor eNB (DeNB), and the cell under the eNB to which the relay node belongs is called a Donor cell.

However, due to the introduction of the relay node, it is urgent to provide an access method to enable the relay node to access the wireless access network.

SUMMARY

A plurality of aspects of present disclosure provide an access method and a transmission point to enable a relay node to access a wireless access network.

In a first aspect, there is provided an access method, including:

receiving, by a first transmission point, indication information sent by a second transmission point, wherein the indication information is used for indicating that the second transmission point supports a relay function; and accessing, by the first transmission point, a wireless access network where the second transmission point is located according to the indication information.

In a second aspect, there is provided another access method, including:

sending, by a second transmission point, indication information to a first transmission point, wherein the indication information is used for indicating that the second transmission point supports a relay function, so that the first transmission point may access a wireless access network where the second transmission point is located according to the indication information.

In a third aspect, there is provided a first transmission point, including:

a receiving unit, configured to receive indication information sent by a second transmission point, wherein the indication information is used for indicating that the second transmission point supports a relay function; and an access unit, configured to access a wireless access network where the second transmission point is located according to the indication information.

In a fourth aspect, there is provided a second transmission point, including:

a sending unit, configured to send indication information to the first transmission point, wherein the indication information is used for indicating that the second transmission point supports a relay function, enabling the first transmission point to access a wireless access network where the second transmission point is located according to the indication information.

In a fifth aspect, there is provided a network device, including: a processor and a memory. The memory is configured to store a computer program, and the processor is configured to call and run the computer program stored in the memory to execute the method in any one of the above first aspect to second aspect or various implementations thereof.

In a sixth aspect, there is provided a chip, for implementing the method in any one of the above first aspect to second aspect or various implementations thereof.

Specifically, the chip comprises: a processor, configured to call a computer program from a memory and run the computer program, causing a device on which the chip is mounted to perform the method as in any one of the above first aspect to second aspect or various implementations thereof.

In a seventh aspect, there is provided a computer readable storage medium, configured to store a computer program, wherein the computer program causes a computer to execute the method in any one of the above first aspect to second aspect or various implementations thereof.

In an eighth aspect, there is provided a computer program product, including: computer program instructions, wherein the computer program instructions cause a computer to perform a method in any of the above first aspect to second aspect or various implementations thereof.

In a ninth aspect, there is provided a computer program, when running on a computer, causing a computer to perform a method in any one of the above first aspect to second aspect or in various implementations thereof.

As is known from above technical schemes, in implementations of present disclosure, the first transmission point receives the indication information sent by the second transmission point, wherein the indication information is used for indicating that the second transmission point supports the relay function, enabling the first transmission point to access the wireless access network where the second transmission point is located according to the indication information, so that the first transmission point, as a relay node, may access the wireless access network.

In addition, by adopting the technical solutions provided by present disclosure, the indication information sent by the second transmission point carries a transmission layer level or a transmission hop number of the second transmission point in the wireless access network, enabling the first transmission point to obtain transmission resources used for accessing the wireless access network according to the transmission layer level or the hop number of the transmission, thereby effectively improving the access efficiency of the wireless access network.

BRIEF DESCRIPTION OF DRAWINGS

In order to describe technical solutions of implementations of present disclosure more clearly, the drawings needed to be used in description of the implementations or related art will be simply introduced below. Apparently, the drawings described below are only some implementations of present disclosure, and one skilled in the art may obtain other drawings according to these drawings without paying an inventive effort.

DETAILED DESCRIPTION

In order to make purpose, technical solutions and advantages of implementations of present disclosure more clear, the technical solutions in the implementations of present disclosure will be described clearly and completely in the following with reference to the drawings in the implementations of present disclosure. Apparently, the described implementations are a part, but not all, of the implementations of present disclosure. Based on the implementations of present disclosure, all other implementations obtained by one ordinary skilled in the art without paying an inventive effort should fall within protection scope of present disclosure.

It should be noted that terminal involved in the implementation of present disclosure may include, but is not limited to, a mobile phone, a Personal Digital Assistant (PDA), a wireless handheld device, a Tablet Computer, a Personal Computer (PC), an MP3 player, an MP4 player, a wearable device (e.g., smart glasses, a smart watch, a smart bracelet etc.), and a vehicle-mounted terminal.

In addition, a term "and/or" in this specification is only an association relationship describing associated objects and represents that there may be three relationships. For example, A and/or B may represent following three cases: only A exists, both A and B exist, and only B exists. In addition, the symbol "/" in this specification generally represents that former and latter associated objects have an "or" relationship.

Figure 1:
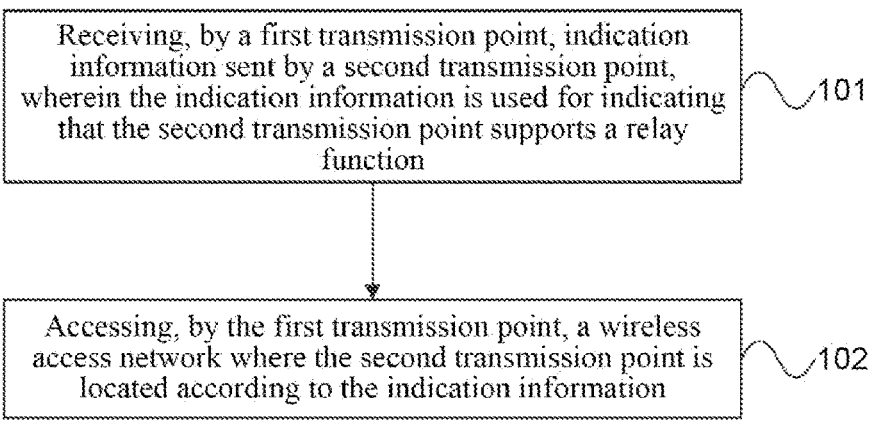
FIG. 1 is a schematic flow chart of an access method provided by an implementation of present disclosure.

FIG. 1 is a schematic flow chart of an access method provided by an implementation of present disclosure, as shown in FIG. 1.

In 101, a first transmission point receives indication information sent by a second transmission point, wherein the indication information is used for indicating that the second transmission point supports a relay function.

In 102, the first transmission point accesses a wireless access network where the second transmission point is located according to the indication information.

Optionally, in present implementation, the second transmission point supports the relay function, which means that the second transmission point supports other transmission points (i.e., the first transmission point) such as a relay device and the like to access the wireless access network where the second transmission point is located.

Optionally, in present implementation, accessing the wireless access network where the second transmission point is located means that the relay device (i.e., the first transmission point) accesses the wireless access network by receiving a synchronization signal sent by the second transmission point and using the second transmission point as an access point.

So far, since the second transmission point supports the relay function, the first transmission point may access the wireless access network where the second transmission point is located through the second transmission point.

It should be noted that the first transmission point may include but is not limited to a first relay device. For a relay system only supporting a single hop access, the second transmission point may be an access network device of the wireless access network. For a relay system supporting a multi-hop access, the second transmission point may be a second relay device or the access network device of the wireless access network. This is not particularly restricted in present implementation.

Optionally, in one possible implementation of the present implementation, in 101, the first transmission point may specifically receive the indication information sent by the second transmission point through a system broadcast message, a synchronization signal or a high-layer signaling.

In a specific implementation process, the first transmission point may specifically receive the indication information sent by the second transmission point through an MIB or an SIB in the system broadcast message.

For example, the indication information may be carried by using K bits in existing Master Information Block (MIB) or System Information Block (SIB) in the system broadcast message. K is an integer greater than or equal to 1, or a new SIB may be added to carry the indication information.

Or, for another example, specifically, the indication information may be indicated by using a reference signal used for transmitting the existing Master Information Block (MIB) or System Information Block (SIB) in the system broadcast message. For example, the indication information may be indicated by a root sequence, a Cyclic shift, an Orthogonal cover code, or the like of a reference signal.

In another specific implementation process, the first transmission point may receive, but not limited to, the indication information sent by the second transmission point through a primary synchronization signal and/or a secondary synchronization signal.

In another specific implementation process, the first transmission point may specifically receive the indication information sent by the second transmission point through a designated synchronization signal.

In another specific implementation process, the first transmission point may specifically receive the indication information sent by the second transmission point through any synchronization signal in a designated group.

Specifically, the synchronization signals may be grouped to obtain two packets, a first packet and a second packet. Synchronization signals in the first packet all represent that the second transmission point supports the relay function. Synchronization signals in the second packet all represent that the second transmission point does not support the relay function. The second transmission point may arbitrarily select a synchronization signal from corresponding packets for transmission according to whether it supports the relay function.

After the first transmission point receives the synchronization signal, it may determine whether the second transmission point supports the relay function according to the synchronization signal and a pre-configured first mapping relationship. The first mapping relationship may be a corresponding relationship between a synchronization signal and a packet, or may also be a corresponding relationship between a synchronization signal and whether or not supporting the relay function. This is not particularly restricted in present implementation.

In another specific implementation process, the first transmission point may specifically receive the indication information sent by the second transmission point through an Radio Resource Control (RRC) message.

Specifically, the indication information may be carried by an Information Element (IE) in the RRC message, and the RRC message may be an RRC message in the prior art, for example, an RRC CONNECTION RECONFIGURATION message, etc. This is not restricted in present implementation. The indication information may be carried by extending the IE of the existing RRC message, or the RRC message may be different from existing RRC messages in the prior art.

In another specific implementation process, the first transmission point may specifically receive the indication information sent by the second transmission point through a Media Access Control (MAC) Control Element (CE) message.

Specifically, the indication information may be carried by adding a new MAC CE message.

Optionally, in one possible implementation of present implementation, in 101, the indication information received by the first transmission point may further carries a transmission layer level or a transmission hop number of the second transmission point in a wireless access network.

For example, Donor eNB, i.e., an access network device, serves as a relay system, i.e., a 0th transmission layer level or a 0th hop number of the transmission in the wireless access network; RN1 connected to the Donor eNB serves as a first transmission layer level or a first hop number of the transmission in the relay system; RN2 connected to RN1 serves as a second transmission layer level or a second hop number of the transmission in the relay system. The second transmission point of various transmission layer levels carries the transmission layer level or the hop number of the transmission of the second transmission point in the wireless access network, in the corresponding indication information transmitted by the second transmission point.

In this way, by carrying the transmission layer level or the hop number of the transmission of the second transmission point in the wireless access network in the indication information sent by the second transmission point, the first transmission point is enabled to obtain the transmission resource used for accessing the wireless access network in combination with a mapping relationship between the transmission layer level or the hop number of the transmission and a transmission resource, according to the transmission layer level or the hop number of the transmission, thereby effectively improving access efficiency of the wireless access network. The mapping relationship may be pre-configured in the first transmission point or transmitted to the first transmission point by means of network configuration.

In present implementation, by receiving the indication information sent by the second transmission point, the first transmission point is enabled to access the wireless access network where the second transmission point is located according to the indication information, wherein the indication information is used for indicating that the second transmission point supports the relay function, thereby enabling the first transmission point to access the wireless access network as a relay node.

In addition, by adopting the technical solution provided by present disclosure, by carrying the transmission layer level or the hop number of the transmission of the second transmission point in the wireless access network, in the indication information sent by the second transmission point, the first transmission point is enabled to obtain the transmission resource used for accessing the wireless access network according to the transmission layer level or the hop number of the transmission, thereby the access efficiency of the wireless access network may be effectively improved.

Figure 2:
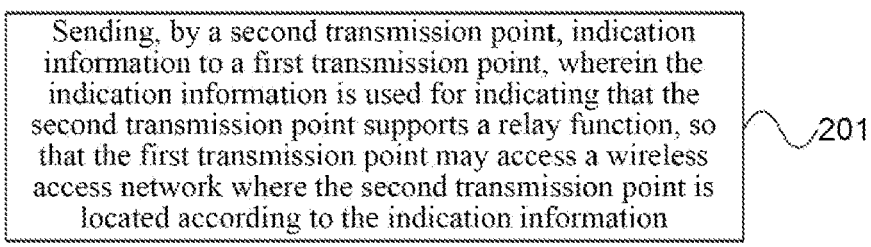
FIG. 2 is a schematic flow chart of another access method provided by another implementation of present disclosure.

FIG. 2 is a schematic flow chart of another access method provided by another implementation of present disclosure, as shown in FIG. 2.

In 201, a second transmission point sends indication information to a first transmission point, wherein the indication information is used for indicating that the second transmission point supports a relay function, so that the first transmission point may access the wireless access network where the second transmission point is located according to the indication information.

Optionally, in present implementation, that the second transmission point supports the relay function, means that the second transmission point supports other transmission points (i.e., the first transmission point) such as a relay device and the like to access the wireless access network where the second transmission point is located.

Optionally, in present implementation, the accessing the wireless access network where the second transmission point is located means that the relay device (i.e., the first transmission point) accesses the wireless access network by receiving a synchronization signal sent by the second transmission point and using the second transmission point as an access point.

So far, since the second transmission point supports the relay function, the first transmission point is enabled to access the wireless access network where the second transmission point is located through the second transmission point.

It should be noted that the first transmission point may include but is not limited to a first relay device. For a relay system only supporting a single hop access, the second transmission point may be an access network device of the wireless access network. For a relay system supporting multi-hop access, the second transmission point may be a second relay device or an access network device of the wireless access network. This is not particularly restricted in present implementation.

Optionally, in one possible implementation of present implementation, in 201, the second transmission point may specifically send the indication information to the first transmission point through a system broadcast message, a synchronization signal or a high-layer signaling.

In a specific implementation process, the second transmission point may specifically send the indication information to the first transmission point through an MIB or an SIB in the system broadcast message.

For example, the indication information may be carried by using K bits in existing Master Information Block (MIB) or System Information Block (SIB) in the system broadcast message. K is an integer greater than or equal to 1, or a new SIB may be added to carry the indication information.

Or, for another example, specifically, the indication information may be indicated by using a reference signal used for transmitting the existing Master Information Block (MIB) or System Information Block (SIB) in the system broadcast message. For example, the indication information may be indicated by a root sequence, a Cyclic shift, an Orthogonal cover code, or the like of a reference signal.

In another specific implementation process, the second transmission point may specifically receive and transmit the indication information to the first transmission point through a primary synchronization signal and/or a secondary synchronization signal.

In another specific implementation process, the second transmission point may specifically receive and send the indication information to the first transmission point by specifying a synchronization signal.

In another specific implementation process, the second transmission point may specifically receive and transmit the indication information to the first transmission point through any synchronization signal within a designated group.

Specifically, synchronization signals may be grouped to obtain two packets of a first packet and a second packet. The synchronization signals in the first packet all represent that the second transmission point supports the relay function; synchronization signals in the second packet all represent that the second transmission point does not support the relay function. The second transmission point may arbitrarily select a synchronization signal from corresponding packets for transmission according to whether it supports the relay function.

After the first transmission point receives the synchronization signal, it may determine whether the second transmission point supports the relay function according to the synchronization signal and the pre-configured first mapping relationship. The first mapping relationship may be a corresponding relationship between a synchronization signal and a packet, or may also be a corresponding relationship between a synchronization signal and whether or not a relay function is supported, which is not particularly limited in present implementation.

In another specific implementation process, the second transmission point may specifically receive and send the indication information to the first transmission point through a Radio Resource Control (RRC) message.

Specifically, the indication information may be carried by an Information Element (IE) in the RRC message, and the RRC message may be an RRC message in the prior art, for example, an RRC CONNECTION RECONFIGURATION message, etc., which is not limited in the implementation. The indication information may be carried by extending IE of an existing RRC message, or the RRC message may be different from existing RRC messages in the prior art.

In another specific implementation process, the second transmission point may specifically send the indication information to the first transmission point through a Media Access Control (MAC) Control Element (CE) message.

Specifically, the indication information may be carried by adding a new MAC CE message.

Optionally, in one possible implementation of present implementation, in 201, the indication information sent by the second transmission point may further carry the transmission layer level or transmission hop number of the second transmission point in the wireless access network.

For example, Donor eNB is an access network device, which serves as a relay system, i.e., the 0th transmission layer level or the 0th transmission hop number in the wireless access network; RN1 connected to Donor eNB serves as the first transmission layer level or the first transmission hop number in the relay system; RN2 connected to RN1 serves as the second transmission layer level or the second transmission hop number in the relay system. The second transmission point of various transmission layer levels carries the transmission layer level or transmission hop number of the second transmission point in the wireless access network in the corresponding indication information transmitted by the second transmission point.

In this way, by carrying the transmission layer level or transmission hop number of the second transmission point in the wireless access network in the indication information sent by the second transmission point, the first transmission point is enabled to obtain the transmission resource used for accessing the wireless access network in combination with the mapping relationship between the transmission layer level or the transmission hop number and the transmission resource according to the transmission layer level or transmission hop number, thereby effectively improving the access efficiency of the wireless access network. The mapping relationship may be pre-configured in the first transmission point or transmitted to the first transmission point through network configuration.

In present implementation, the first transmission point receives the indication information sent by the second transmission point for indicating that the second transmission point supports the relay function, so that the first transmission point may access the wireless access network where the second transmission point is located according to the indication information, thereby realizing that the first transmission point is used as a relay node to access the wireless access network.

In addition, by adopting the technical scheme provided by present disclosure, the indication information sent by the second transmission point carries the transmission layer level or the transmission hop number of the second transmission point in the wireless access network, so that the first transmission point may obtain the transmission resources used for accessing the wireless access network according to the transmission layer level or the transmission hop number, and the access efficiency of the wireless access network may be effectively improved.

It should be noted that for sake of conciseness, above method implementations are all expressed as a series of act combinations. But one skilled person in the art should know that present disclosure is not limited by described sequence of acts, since according to present disclosure, some acts may be performed with other sequences or simultaneously. Secondly, one skilled person in the art should also know that the implementations described in the specification are all preferred implementations, and the acts and modules involved are not always necessary to present disclosure.

In the above implementations, the description of each implementation has its own emphasis. A part which is not described in detail in an implementation may be referred to related descriptions in other implementations.

Figure 3:
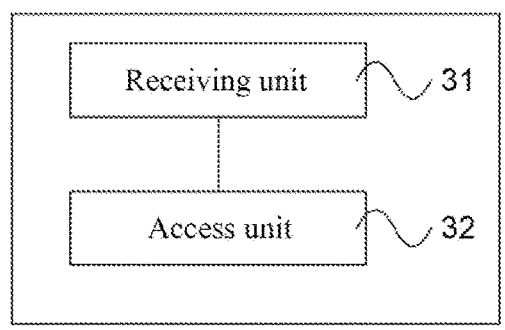
FIG. 3 is a schematic structural diagram of a first transmission point provided by another implementation of present disclosure.

FIG. 3 is a schematic structure diagram of a first transmission point provided by another implementation of present disclosure, as shown in FIG. 3. The first transmission point of present implementation may include a receiving unit 31 and an access unit 32. The receiving unit 31 is configured to receive indication information sent by a second transmission point, wherein the indication information is used to indicate that the second transmission point supports a relay function. The access unit 32 is configured to access a wireless access network where the second transmission point is located according to the indication information.

It should be noted that the first transmission point may include but is not limited to a first relay device; for a relay system only supporting a single hop access, the second transmission point may be an access network device of the wireless access network; for a relay system supporting multi-hop access, the second transmission point may be a second relay device or an access network device of the wireless access network. This is not particularly restricted in present implementation.

Optionally, in one possible implementation of present implementation, the receiving unit 31 may be specifically configured to receive the indication information sent by the second transmission point through a system broadcast message, a synchronization signal or a high-layer signaling.

In a specific implementation process, the receiving unit 31 may be specifically configured to receive the indication information sent by the second transmission point through an MIB or an SIB in the system broadcast message.

In another specific implementation process, the receiving unit 31 may be specifically configured to receive the indication information sent by the second transmission point through a primary synchronization signal and/or a secondary synchronization signal.

In another specific implementation process, the receiving unit 31 may be specifically configured to receive the indication information sent by the second transmission point through a designated synchronization signal; or receive the indication information sent by the second transmission point through any synchronization signal in a designated group.

In another specific implementation process, the receiving unit 31 may be specifically configured to receive the indication information sent by the second transmission point through an RRC message.

Optionally, in one possible implementation of present implementation, the indication information may further carry a transmission layer level or a transmission hop number of the second transmission point in the wireless access network.

It should be noted that the method executed by the first transmission point in the implementation corresponding to FIG. 1 may be implemented by the first transmission point provided in present implementation. Detailed descriptions may be referred to relevant contents in the implementation corresponding to FIG. 1, which are not described here.

In present implementation, by receiving, by the receiving unit, the indication information sent by the second transmission point, wherein the indication information is used for indicating that the second transmission point supports the relay function, the access unit may access the wireless access network where the second transmission point is located according to the indication information, thereby enabling the first transmission point to access the wireless access network as a relay node.

In addition, by adopting the technical solution provided by present disclosure, by carrying the transmission layer level or the hop number of the transmission of the second transmission point in the wireless access network in the indication information sent by the second transmission point, the first transmission point is enabled, according to the transmission layer level or the transmission hop number, to obtain a transmission resource used for accessing the wireless access network, thereby effectively improving the access efficiency of the wireless access network.

Figure 4:
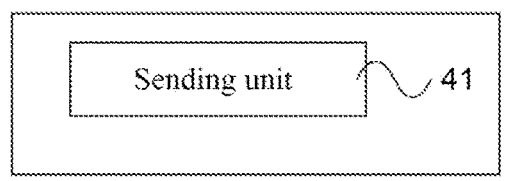
FIG. 4 is a schematic structural diagram of a second transmission point provided by another implementation of present disclosure.

FIG. 4 is a schematic structure diagram of a second transmission point provided by another implementation of present disclosure, as shown in FIG. 4. The second transmission point of present implementation may comprise a sending unit 41, configured to send indication information to a first transmission point, wherein the indication information is configured to indicate that the second transmission point supports a relay function, so that the first transmission point is enabled to access the wireless access network where the second transmission point is located according to the indication information.

It should be noted that the first transmission point may include but is not limited to a first relay device; for a relay system only supporting a single hop access, the second transmission point may be an access network device of the wireless access network; for a relay system supporting multi-hop access, the second transmission point may be a second relay device or the access network device of the wireless access network. This is not particularly restricted in present implementation.

Optionally, in one possible implementation of present implementation, the sending unit 41 may be specifically configured to send the indication information to the first transmission point through a system broadcast message, a synchronization signal or a high-layer signaling.

In a specific implementation process, the sending unit 41 may be specifically configured to receive and send the indication information to the first transmission point through an MIB or an SIB in the system broadcast message.

In another specific implementation process, the sending unit 41 may be specifically configured to receive and send the indication information to the first transmission point through a primary synchronization signal and/or a secondary synchronization signal.

In another specific implementation process, the sending unit 41 may be specifically configured to receive and send the indication information to the first transmission point through a designated synchronization signal; or receive and send the indication information to the first transmission point through any synchronization signal in a designated group.

In another specific implementation process, the sending unit 41 may be specifically configured to receive and send the indication information to the first transmission point through an RRC message.

Optionally, in one possible implementation of present implementation, the indication information may further carry the transmission layer level or the hop number of the transmission of the second transmission point in the wireless access network.

It should be noted that the method executed by the second transmission point in the implementation corresponding to FIG. 2 may be implemented by the second transmission point provided in present implementation. Detailed descriptions may be referred to relevant contents in the corresponding implementation of FIG. 2, which are not described here.

In present implementation, by sending the indication information to the first transmission point by the sending unit, wherein the indication information is used for indicating that the second transmission point supports the relay function, the first transmission point is enabled to, according to the indication information, access the wireless access network where the second transmission point is located, thereby enabling the first transmission point to access the wireless access network as a relay node.

In addition, by adopting the technical solution provided by present disclosure, by, in the indication information sent by the second transmission point, carrying the transmission layer level or the hop number of the transmission of the second transmission point in the wireless access network, the first transmission point is enabled to obtain the transmission resource used for accessing the wireless access network according to the transmission layer level or the hop number of the transmission, thereby effectively improving the access efficiency of the wireless access network.

Figure 5:
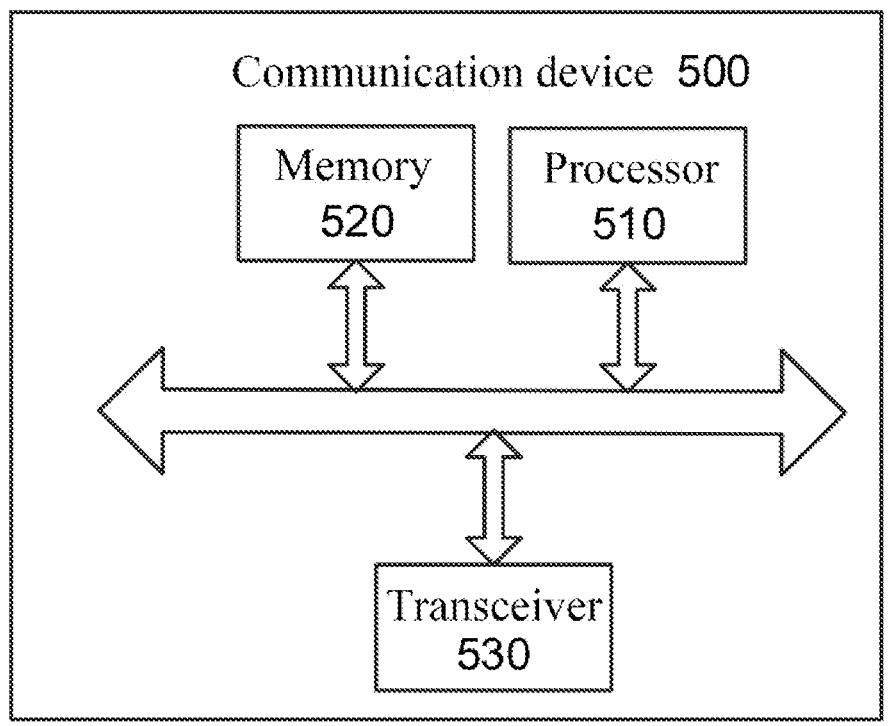
FIG. 5 is a schematic block diagram of a communication device provided by an implementation of present application.

FIG. 5 is a schematic structure diagram of a communication device 500 provided by an implementation of present application. The communication device 500 shown in FIG. 5 includes a processor 510 that may call and run a computer program from a memory to implement the method in the implementation of present application.

Optionally, as shown in FIG. 5, the communication device 500 may further include a memory 520. The processor 510 may call and run the computer program from the memory 520 to implement the method in the implementation of present application.

The memory 520 may be a separate device independent from the processor 510 or may be integrated in the processor 510.

It should be understood that the processor in the implementation of present application may be an integrated circuit chip with a capability for processing signals. In an implementation process, various acts of the method implementations may be completed by integrated logic circuits of hardware in the processor or instructions in a form of software. The above processor may be a general purpose processor, a Digital Signal Processor (DSP), an Application Specific Integrated Circuit (ASIC), a Field Programmable Gate Array (FPGA), or other programmable logic device, a discrete gate or transistor logic device, or a discrete hardware component. Various methods, acts and logic block diagrams disclosed in the implementations of present application may be implemented or executed. The general purpose processor may be a microprocessor or the processor may be any conventional processor or the like. The acts of the method disclosed in combination with the implementation of present application may be directly embodied with an execution to complete by a hardware decoding processor, or with an execution to complete by a combination of hardware and software modules in a decoding processor. The software modules may be located in the known storage medium in the art, such as a random access memory, a flash memory, a read-only memory, a programmable read-only memory, or an electrically erasable programmable memory, or a register. The storage medium is located in the memory, and the processor reads information in the memory and completes the acts of the above method in combination with its hardware.

It should be understood that the memory in the implementations of present application may be a transitory memory or non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external high-speed cache. With an exemplary and a non-limiting explanation, many forms of RAMs are available, such as a Static Random Access Memory (SRAM), a dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described in present specification is intended to include, but is not limited to, these and any other suitable types of memories.

It should be understood that, the foregoing memory is an example for illustration and should not be construed as limiting. For example, the memory in the implementations of present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Optionally, as shown in FIG. 5, the communication device 500 may further comprise a transceiver 530. The processor 510 may control the transceiver 530 to communicate with other devices, in particular, may send information or data to other devices or receive information or data sent by other devices.

The transceiver 530 may comprise a transmitter and a receiver. The transceiver 530 may further include antennas, and the quantity of antennas may be one or more.

Optionally, the communication device 500 may specifically be a network device according to the implementation of present application, and the communication device 500 may implement a corresponding process implemented by the network device in various methods according to the implementation of present application, which will not be described here for sake of conciseness.

Optionally, the communication device 500 may be a terminal device of the implementation of present application. The communication device 500 may implement a corresponding process implemented by the terminal device in various methods of the implementation of present application, which will not be described here for the sake of conciseness.

Figure 6:
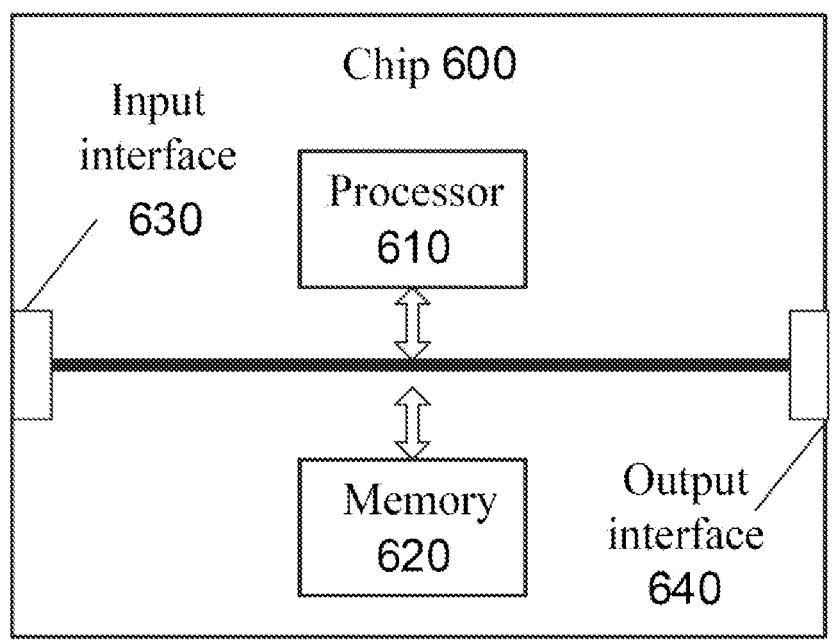
FIG. 6 is a schematic block diagram of a chip provided by an implementation of present application.

FIG. 6 is a schematic structure diagram of a chip according to an implementation of present application. The chip 600 shown in FIG. 6 includes a processor 610 that may call and run a computer program from a memory to implement a method in the implementation of present application.

Optionally, as shown in FIG. 6, the chip 600 may further comprise a memory 620. The processor 610 may call and run a computer program from the memory 620 to implement the method in the implementation of present application.

The memory 620 may be a separate device independent from the processor 610 or may be integrated in the processor 610.

It should be understood that the processor according to the implementation of present application may be an integrated circuit chip with a capability for processing signals. In implementation processes, various acts of method implementations may be completed by integrated logic circuits of hardware in the processor or instructions in a form of software. Above processor may be a general purpose processor, a Digital Signal Processor (DSP), an Application Specific Integrated Circuit (ASIC), a Field Programmable Gate Array (FPGA), or other programmable logic device, a discrete gate or a transistor logic device, or a discrete hardware component. Various methods, acts and logic block diagrams disclosed in the implementations of present application may be implemented or executed. The general purpose processor may be a microprocessor or the processor may be any conventional processor or the like. The acts of the method disclosed in combination with the implementation of present application may be directly embodied with an execution to complete by a hardware decoding processor, or with an execution to complete by a combination of hardware and software modules in a decoding processor. The software modules may be located in a storage medium known in the art, such as a random access memory, a flash memory, a read-only memory, a programmable read-only memory, or an electrically erasable programmable memory, or a register. The storage medium is located in the memory, and the processor reads information in the memory and completes the acts of the above method in combination with its hardware.

It should be understood that the memory in the implementations of present application may be a transitory memory or non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external high-speed cache. As an exemplary and a non-limiting explanation, many forms of RAMs are available, such as a Static Random access memory (SRAM), a dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM), and a Direct Rambus RAM (DR RAM). It should be noted that the memory of the systems and methods described herein is intended to include, but is not limited to, these and any other suitable types of memories.

It should be understood that, the foregoing memory is an example for illustration and should not be construed as limiting. For example, the memory in the implementations of present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods in the implementations of present disclosure are intended to include, but are not limited to, these and any other suitable types of memories.

Optionally, the chip 600 may further include an input interface 630. The processor 610 may control the input interface 630 to communicate with other devices or chips, specifically, may obtain information or data transmitted by other devices or chips.

Optionally, the chip 600 may further include an output interface 640. The processor 610 may control the output interface 640 to communicate with other devices or chips, specifically, may output information or data to other devices or chips.

Optionally, the chip may be applied to a network device in the implementation of present application, and the chip may implement a corresponding process implemented by the network device in various methods in the implementation of present application, which will not be described here for sake of conciseness.

Optionally, the chip may be applied to a terminal device in the implementation of present application, and the chip may realize a corresponding process realized by the terminal device in various methods in the implementation of present application, which will not be described here for sake of conciseness.

It should be understood that the chip mentioned in the implementations of present application may also be referred to as a system-level chip, system chip, a chip system or a system-on-chip, etc.

An implementation of present application further provides a computer-readable storage medium.

Optionally, the computer-readable storage medium may be applied to a network device in the implementations of present application, and the computer program causes the computer to execute a corresponding process implemented by the network devices in various methods of the implementations of present application, which will not be described here for sake of conciseness.

Optionally, the computer-readable storage medium may be applied to a terminal device in the implementation of present application, and the computer program causes the computer to execute a corresponding process implemented by the terminal device in various methods in the implementations of present application, which will not be described here for conciseness.

An implementation of the present disclosure also provides a computer program product including computer program instructions.

Optionally, the computer program product may be applied to a network device in the implementation of present application, and the computer program instructions cause a computer to execute a corresponding process implemented by the network devices in various methods of the implementations of present application, which will not be described here for sake of conciseness.

Optionally, the computer program product may be applied to a terminal device in the implementation of present application, and the computer program instructions cause the computer to execute a corresponding process implemented by the terminal device in various methods of the implementations of present application, which will not be described here for sake of conciseness.

An implementation of the present disclosure also provides a computer program.

Optionally, the computer program may be applied to a network device in the implementation of present application. When the computer program is run on a computer, the computer is enabled to execute a corresponding process implemented by the network device in various methods in the implementations of present application, which will not be described here for sake of conciseness.

Optionally, the computer program may be applied to a terminal device in the implementation of present application. When the computer program is run on the computer, the computer is enabled to execute a corresponding process implemented by the terminal device in various methods in the implementations of present application, which will not be described here for sake of brevity.

One ordinary skilled in the art may realize that various exemplary elements and algorithm acts described in combination with the implementations disclosed in present document may be implemented in electronic hardware, or a combination of computer software and electronic hardware. Whether these functions are implemented in hardware or software depends on a specific application and design constraints of the technical solution. One professional skilled may use different methods to implement described functions for each particular application, but this implementation should not be considered to be beyond scope of present application.

One skilled in the art may clearly understand that for convenience and conciseness of description, specific working processes of above system, apparatus and unit may refer to a corresponding process in the method implementations and will not be described here.

In several implementations provided by present disclosure, it should be understood that the disclosed system, apparatus and unit may be implemented in other ways. For example, above described apparatus implementation is only illustrative. For example, a division of the units is only a logical function division, and there may be other division ways in actual implementation, for example, multiple units or components may be combined or integrated into another system, or some features may be ignored or not executed. On the other hand, a mutual coupling or direct coupling or communication connection shown or discussed may be an indirect coupling or communication connection through some interfaces, apparatuses or units, and may be electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve a purpose of present implementation.

In addition, various functional units in various implementations of present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of present application, in essence, or a part contributing to the prior art, or a part of the technical solution, may be embodied in a form of a software product, the software product being stored in a storage medium, including a number of instructions for causing a computer device (which may be a personal computer, a server, or a network device and the like) to execute all or a part of the acts of the method described in various implementations of present application. Aforementioned storage medium includes various medium capable of storing program codes, such as a U disk, a mobile hard disk, a Read-Only Memory (ROM), a Random Access Memory (RAM), a magnetic disk, or an optical disk and the like.

What are described above are merely specific implementations of present application, but a protection scope of present application is not limited hereto. Any variation or substitute that may be easily conceived by one skilled in the art within a technical scope disclosed by present application shall be included within a protection scope of present application. Therefore, the protection scope of present application should be determined by a protection scope of claims.

What is claimed is:

1. A relay method, comprising:
    sending, by a first wireless communication device, first indication information to a second wireless communication device, wherein the first indication information is used to indicate that the first wireless communication device supports a relay function, and used to enable the second wireless communication device to access to a wireless access network provided by the first wireless communication device, wherein the first wireless communication device is a first relay device, wherein the second wireless communication device is a second relay device, and wherein the first and second wireless communication devices are not access network devices; and wherein
    the first indication information is sent through one of: a Master Information Block (MIB), a System Information Block (SIB), a Radio Resource Control (RRC) message or a higher layer signaling; and
    wherein the first indication information in combination with a mapping relationship is used by the second wireless communication device to determine a transmission resource; and
    wherein the mapping relationship is between a transmission layer level or a transmission hop number and the transmission resource.

2. The method of claim 1, wherein the first wireless communication device comprises the first relay device, and the method further comprises:
    receiving, by the first wireless communication device, second indication information sent by a third wireless communication device, wherein the second indication information is used to indicate that the third wireless communication device supports a relay function.

3. The method of claim 2, further comprising:
    accessing, by the first wireless communication device, a wireless access network provided by the third wireless communication device according to the second indication information.

4. The method of claim 1, wherein, the first indication information is sent through a synchronization signal, comprises:
    sending, by the first wireless communication device, the first indication information to the second wireless communication device through a primary synchronization signal and/or a secondary synchronization signal.

5. The method of claim 1, wherein, the first indication information is sent through a synchronization signal, comprises:
    sending, by the first wireless communication device, the indication information to the second wireless communication device by a designated synchronization signal; or
    sending, by the first wireless communication device, the indication information to the second wireless communication device through a synchronization signal in a designated group.

6. A communication device, comprising: a transceiver, a memory configured to store computer instructions, and a processor configured to call and execute the computer instructions in the memory to control the transceiver to send first indication information to a second wireless communication device, wherein the first indication information is used to indicate that the communication device supports a relay function, and used to enable the second wireless communication device to access to a wireless access network provided by the communication device, wherein the communication device is a first relay device, wherein the second wireless communication device is a second relay device, and wherein the first and second wireless communication devices are not access network devices; and wherein
    the first indication information is sent through one of: a Master Information Block (MIB), a System Information Block (SIB), a Radio Resource Control (RRC) message, or a higher layer signaling; and
    wherein the first indication information in combination with a mapping relationship is used by the second wireless communication device to determine a transmission resource; and
    wherein the mapping relationship is between a transmission layer level or a transmission hop number and the transmission resource.

7. The communication device of claim 6, wherein the communication device is the first relay device, the processor is further configured to call and execute the computer instructions in the memory to control the transceiver to receive second indication information sent by a third wireless communication device, wherein the second indication information is used to indicate that the third wireless communication device supports a relay function.

8. The communication device of claim 7, wherein the processor is configured to access a wireless access network provided by the third wireless communication device according to the second indication information.

9. The communication device of claim 6, wherein the first indication information is sent through the synchronization signal,
the processor is further configured to call and execute the computer instructions in the memory to control the transceiver to send the first indication information to the second wireless communication device through a primary synchronization signal and/or a secondary synchronization signal.

10. The communication device of claim 6, wherein the first indication information is sent through the synchronization signal,
the processor is further configured to call and execute the computer instructions in the memory to control the transceiver to send the indication information to the second wireless communication device by a designated synchronization signal.

11. The communication device of claim 6, wherein the first indication information is sent through the synchronization signal,
the processor is further configured to call and execute the computer instructions in the memory to control the transceiver to send the indication information to the second wireless communication device through a synchronization signal in a designated group.

12. A chip, comprising: a processor configured to call and run a computer program from a memory, causing a device on which the chip is mounted to execute the method of claim 1.

13. A non-transitory computer-readable storage medium, configured to store a computer program, wherein the computer program causes a computer to perform the method of claim 1.

* * * * *